June 9, 1925.  S. B. BALDWIN  1,541,314

TIRE CHAIN FASTENER

Filed Feb. 18, 1925

Inventor
S. B. Baldwin,
By Clarence A. O'Brien
Attorney

Patented June 9, 1925.

1,541,314

UNITED STATES PATENT OFFICE.

SIMON BENNETT BALDWIN, OF GALVA, ILLINOIS.

TIRE-CHAIN FASTENER.

Application filed February 18, 1925. Serial No. 10,003.

*To all whom it may concern:*

Be it known that I, SIMON BENNETT BALDWIN, a citizen of the United States, residing at Galva, in the county of Henry and State of Illinois, have invented certain new and useful Improvements in Tire-Chain Fasteners, of which the following is a specification.

This invention relates to an improved device known as a chain fastener, the same being especially, although not necessarily intended to be used in connection with automobile tire chains, for fastening the ends of the circumferential side chains of the tire chain together.

The object of the invention is to generally improve upon fasteners of this class, by providing one of comparative simplicity and durability, which is practical in construction, easy to apply to the ends of the side chains, absolutely secure in connecting said ends together, and of such a construction as to render attachment of the end links of the chains easy.

Other objects and advantages and features of the invention will become apparent from the following description and drawing.

In the accompanying drawing, forming a part of this application, and in which like numerals are employed to designate like parts throughout the same:

Figure 1:
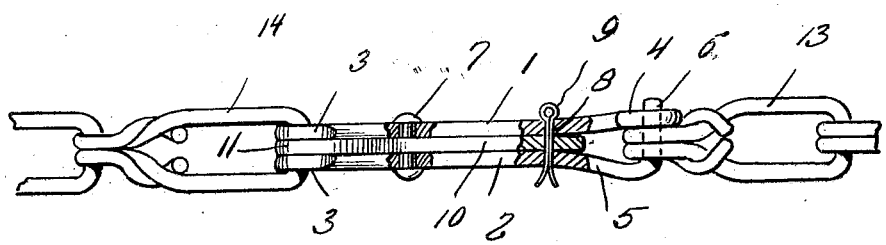
Figure 1 is a top plan view, with portions broken away and shown in section of a tire chain fastener constructed in accordance with the present invention.

Referring to the drawing in detail, it will be seen that the improved fastener comprises a pair of spaced side bars 1 and 2 respectively, each of these bars being formed at corresponding ends with chain anchoring hooks 3. The bar 1 is formed at its opposite end with a similar hook 4, while the corresponding end of the bar 2 is offset outwardly from the point 5 is decreased in width and formulated into a right angularly disposed extension 6. The hook 4 is intended to be engaged with the extension 6, as shown, to maintain the parts in assembled parallel spaced relation, after the pivot pin 7 is passed therethrough. As shown more clearly in Figure 3, these bars are provided with openings 8, which are adapted to register with each other to permit passage of a retaining cotter pin 9 therethrough (see Figures 1 and 2). Disposed between the bars 1 and 2 is a retaining member 10, mounted intermediate its ends upon the pivot pin 7. At one end the member 10 is formed with a hook 11 disposed in reverse direction to the hook 3 and adapted to co-act therewith in holding the chain in place. At its opposite end it is provided with an opening 12 adapted to register with the openings 8, to permit passage of the aforesaid cotter pin 9 therethrough.

Figure 3:
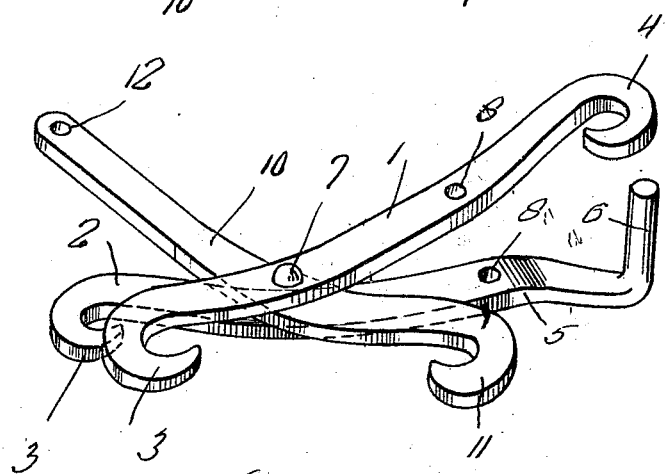
Figure 3 is a detail perspective view of the improved fastener, showing the manner in which the elements of the device are moved to facilitate connection or disengagement of the end links of a tire chain.

In applying the right hand end link 13 of a chain the eye of the link is passed over the cylindrical right angularly disposed extension 6, when the parts of the device, are in the relation shown in Figure 3. At this time, the bar 1 is swung so that its hook 4 provides the necessary clearance in attaching the link. With the link in place, the bar 1 is swung about the pivot 7, and the hook is sprung over the free end of the extension 6 to assume the position shown in Figure 1. The resiliency of the bar permits this swinging action. To aid in permitting this connection, however, the member 10 preferably assumes the approximate position shown in Figure 3 to permit movement of the hook 3 toward the complemental hook on the bar 2. In practice, it has been found that the pivotal connection 7 may be sufficiently loose to permit rocking of the bar 1 upon the bar 10, to permit the connection of the hook 4 with the extension 6, and under such conditions it is not absolutely essential that the bar 1 be of resilient nature. With the link 13 in place, as shown in Figure 1, the hooks 3 assume horizontal alignment, so that the other link 14 at the opposite end of the chain can be connected to the hook 3.

Figure 2:
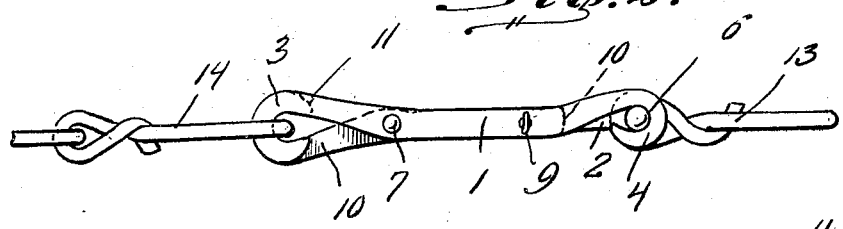
Figure 2 is a side elevation thereof, showing the device inverted with respect to Figure 1.

Assuming that the link 14 is now seated in the hooks 3, the locking lever or member 10 is swung about its pivot to bring the hook 11 over the bight portion of the link 14, at which time the opening 12 is in registry with the openings 8, and the cotter pin 9 may then be passed through these registering openings to retain the parts in the relation shown in Figure 1.

It is thought that the foregoing description taken in connection with the accompanying drawings will enable persons skilled in the art to which the invention relates to obtain a clear understanding of the same.

Therefore, a more lengthy description is thought unnecessary.

Although the preferred embodiment of the invention has been specifically shown and described, it is to be understood that minor changes coming within the field of invention claimed may be resorted to, if desired.

I claim:

1. A tire chain fastener comprising a pair of spaced bars, one bar being provided at one end with a laterally disposed extension and at its opposite ends with a hook, the other bar being provided at its opposite ends with hooks, one of which is adapted to be connected with said extension, and a retaining lever disposed between and pivotally connected with said bars, said retaining lever being provided with a hook at one end adapted to cooperate with the opposed hooks on said bars.

2. A tire chain fastener comprising a pair of spaced side bars, one of said bars being provided at one end with a hook, the opposite end of the bar being offset outwardly and the extremity thereof terminating in an angularly disposed cylindrical extension, the other bar being provided at its opposite ends with hooks, one hook being adapted to be disposed opposite the first named hook, and the remaining hook being adapted to be connected with said cylindrical extension, a retaining lever disposed between said bars, a pivot pin passing through said bars and retaining lever, said retaining lever being provided at one end with a hook adapted to cooperate with the opposed hooks on said bars, said bars and retaining lever being formed with openings adapted to register with each other to receive a removable retaining pin.

In testimony whereof I affix my signature.

SIMON BENNETT BALDWIN.